(12) United States Patent
Lei et al.

(10) Patent No.: US 7,112,961 B2
(45) Date of Patent: Sep. 26, 2006

(54) METHOD AND APPARATUS FOR DYNAMICALLY MEASURING THE THICKNESS OF AN OBJECT

(75) Inventors: Lawrence C. Lei, Milpitas, CA (US); Siqing Lu, San Jose, CA (US); Yu Chang, San Jose, CA (US); Cecilia Martner, Los Gatos, CA (US); Quyen Pham, Sunnyvale, CA (US); Yu Ping Gu, Sunnyvale, CA (US); Joel Huston, San Jose, CA (US); Paul Smith, Campbell, CA (US); Gabriel Lorimer Miller, Eastham, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/685,210

(22) Filed: Oct. 14, 2003

(65) Prior Publication Data

US 2004/0140797 A1  Jul. 22, 2004

Related U.S. Application Data (60) Provisional application No. 60/433,429, filed on Dec. 13, 2002.

(51) Int. Cl.
  *G01B 7/06* (2006.01)
  *G01N 27/72* (2006.01)
(52) U.S. Cl. ........................ 324/230; 324/226
(58) Field of Classification Search ................ 324/225, 324/228–243, 226; 451/8; 356/614
  See application file for complete search history.

(56) References Cited

U.S. PATENT DOCUMENTS

| | | | |
|---|---|---|---|
| 4,207,520 A | 6/1980 | Flora et al. | |
| 4,209,744 A | 6/1980 | Gerasimov et al. | |
| 4,593,244 A | 6/1986 | Summers et al. | |
| 4,609,870 A | 9/1986 | Lale et al. | |
| 4,766,374 A * | 8/1988 | Glass et al. | 324/207.24 |
| 4,819,167 A * | 4/1989 | Cheng et al. | 700/59 |
| 4,880,348 A * | 11/1989 | Baker et al. | 414/783 |
| 4,943,446 A * | 7/1990 | Isherwood et al. | 427/9 |
| 5,323,951 A * | 6/1994 | Takechi et al. | 228/102 |

(Continued)

FOREIGN PATENT DOCUMENTS

DE  4227734 C2  5/1996

(Continued)

OTHER PUBLICATIONS

May 21, 2004. International Search Report for PCT/US03/39551.

(Continued)

*Primary Examiner*—Jay M. Patidar
(74) *Attorney, Agent, or Firm*—Wilmer Cutler Pickering Hale & Dorr (57) ABSTRACT

A method and apparatus are provided for measuring the thickness of a test object. The apparatus includes an eddy current sensor having first and second sensor heads. The sensor heads are positioned to have a predetermined gap therebetween for passage by at least a portion of the test object through the gap. The sensor heads make measurements at given sampling locations on the test object as the test object is moved through the gap. The apparatus also includes a position sensing mechanism to determine positions of the sampling locations on the test object. The apparatus also includes an evaluation circuit in communication with the eddy current sensor and to the position sensing mechanism for determining the thickness of the test object at the sampling locations.

45 Claims, 8 Drawing Sheets

U.S. PATENT DOCUMENTS

| | | | | |
|---|---|---|---|---|
| 5,396,050 | A * | 3/1995 | Ebihara et al. | 219/603 |
| 5,485,082 | A * | 1/1996 | Wisspeintner et al. | 324/202 |
| 5,534,289 | A | 7/1996 | Bilder et al. | |
| 5,822,213 | A * | 10/1998 | Huynh | 700/213 |
| 5,886,521 | A * | 3/1999 | Hassan | 324/227 |
| 5,917,601 | A * | 6/1999 | Shimazaki et al. | 356/622 |
| 6,271,670 | B1 | 8/2001 | Caffey | |
| 6,578,893 | B1 * | 6/2003 | Soucy et al. | 294/99.1 |
| 6,633,159 | B1 * | 10/2003 | Robar et al. | 324/240 |
| 6,650,106 | B1 * | 11/2003 | Daalmans et al. | 324/164 |
| 6,700,370 | B1 * | 3/2004 | Chen et al. | 324/230 |
| 6,710,886 | B1 * | 3/2004 | Park et al. | 356/614 |
| 6,753,964 | B1 * | 6/2004 | Chen et al. | 356/400 |
| 6,774,624 | B1 * | 8/2004 | Anderson et al. | 324/207.17 |
| 6,803,757 | B1 * | 10/2004 | Slates | 324/207.17 |
| 6,808,590 | B1 * | 10/2004 | Gotkis et al. | 156/345.16 |
| 6,850,053 | B1 * | 2/2005 | Daalmans et al. | 324/164 |
| 6,917,433 | B1 * | 7/2005 | Levy et al. | 356/630 |
| 2002/0077031 | A1 | 6/2002 | Johansson et al. | |

FOREIGN PATENT DOCUMENTS

WO      WO 01/89765 A1      11/2001

OTHER PUBLICATIONS

Nonaka, Yoshihiro. Apr. 2, 1996. "A Double Coil Method for Simultaneously Measuring the Resistivity, Permeability, and Thickness of a Moving Metal Sheet." *IEEE Transactions on Instrumentation and Measurement*. vol. 45, No. 2, pp. 478-482.

May 25, 2005. International Preliminary Examination Report from PCT Application No. PCT/US03/39551.

Jan. 28, 2005. Written Opinion from PCT Application No. PCT/US03/39551.

* cited by examiner

METHOD AND APPARATUS FOR DYNAMICALLY MEASURING THE THICKNESS OF AN OBJECT

RELATED APPLICATION

The present invention is based on and claims priority from U.S. Provisional Patent Application Ser. No. 60/433,429 filed on Dec. 13, 2002 and entitled METHOD AND APPARATUS FOR MEASURING OBJECT THICKNESS, which is incorporated by reference in its entirety hereby.

BACKGROUND OF THE INVENTION

1. Field of the Invention

The present invention relates generally to devices for measuring the thickness of objects and, more particularly, to devices having eddy current sensors for measuring thickness.

2. Description of Related Art

Eddy current sensors are non-contact measurement devices used for measuring the thickness of conductive objects. Briefly, an eddy current sensor includes a sensor coil, which when driven by an AC current, generates an oscillating magnetic field that induces an eddy current in the surface of a nearby conductive object. The eddy current is dependent on the strength of the magnetic B-field created by the AC current and the impedance of the object, which is related to the thickness of the object and the resistivity of the object. The thickness of the object can be determined based on the known resistivity of the object and the measured eddy current or impedance.

In semiconductor manufacturing, one common use of eddy current sensors is for measuring the thickness of a conductive layer (such as, e.g., a copper layer) deposited on a wafer substrate. Eddy current sensors are used for determining the thickness of a conductive layer at various sampling locations on the wafer. In many cases, it is important to have a generally uniform conductive layer thickness to avoid problems in subsequent processing such as etching. It is accordingly important to be able to accurately determine the thickness of conductive layers so that corrective action can be taken, if needed, to obtain a desired thickness. Alternatively, the wafer can be scrapped to avoid the unnecessary expense of further processing.

Currently available eddy current sensor devices for measuring the thickness of conductive layers on wafers are generally very slow. These devices can also be very sensitive to inadvertent movement of the object relative to the eddy current sensors and, accordingly, often have complex and costly position control mechanisms in an attempt to provide a generally uniform distance between the sensor and the wafer.

BRIEF SUMMARY OF EMBODIMENTS OF THE INVENTION

Methods and apparatus are provided for measuring the thickness of a test object such as, e.g., a portion of a conductive layer deposited on a wafer substrate. An apparatus in accordance with one or more embodiments of the invention includes an eddy current sensor having first and second sensor heads. The sensor heads are positioned to have a predetermined gap therebetween for passage by at least a portion of the test object through the gap. The sensor heads make measurements at given sampling locations on the test object while the test object is moved through the gap.

The apparatus also includes a position sensing mechanism to determine positions of the sampling locations on the test object. The apparatus also includes an evaluation circuit in communication with the eddy current sensor and with the position sensing mechanism for determining the thickness of the test object at the sampling locations. The apparatus can also include a mechanism for moving the test object through the gap while the measurements are made.

In accordance with one or more embodiments of the invention, the apparatus also includes a displacement sensor for detecting any displacement of the test object in a direction generally extending between the first and second sensor heads. The displacement sensor is in communication with the evaluation circuit, which adjusts the measurements of the sensor heads to compensate for any detected displacement of the test object.

A method in accordance with one or more embodiments of the invention includes making measurements at sampling locations on the test object using first and second eddy current sensor heads positioned on opposite sides of the test object. The method also includes determining the positions of the sampling locations on the test object, and calculating the thickness of the test object at the sampling locations. The test object is moved relative to the sensor heads while making the measurements.

In accordance with one or more embodiments of the invention, the method also includes the step of detecting any displacement of the test object in a direction generally extending between the first and second sensor heads. The measurements can then be adjusted to compensate for any detected displacement of the test object.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense.

DETAILED DESCRIPTION OF PREFERRED EMBODIMENTS

The present invention is generally directed to an on-the-fly eddy current sensor device for rapidly and accurately determining the thickness of a test object at various sampling locations on the object. Briefly, the device includes an eddy current sensor having two opposed heads that are spaced apart by a predetermined gap. During use, a portion of the test object is moved through the gap, and the thickness of the test object is determined at various sampling locations on the test object while the test object is being moved. The device also includes a set of position sensors, which can be used to determine the position of the sampling locations relative to the test object when measurements are made.

Using two eddy current sensor heads on opposite sides of the test object improves the accuracy of measurements because the device is significantly less sensitive to inadvertent movement or vibration of a given sampling location toward or away from the sensor heads resulting from passage of the test object through the gap. The measurements can be made on-the-fly, allowing multiple sampling locations to be quickly measured.

One or more embodiments of the present invention contemplate the inclusion of a Z-position displacement sensor to determine the distance between the test object and the sensor heads in order to determine any distance related compensation factor to be applied to the raw data to compensate for distance and vibration effects to even further improve measurement accuracy.

Figure 1:
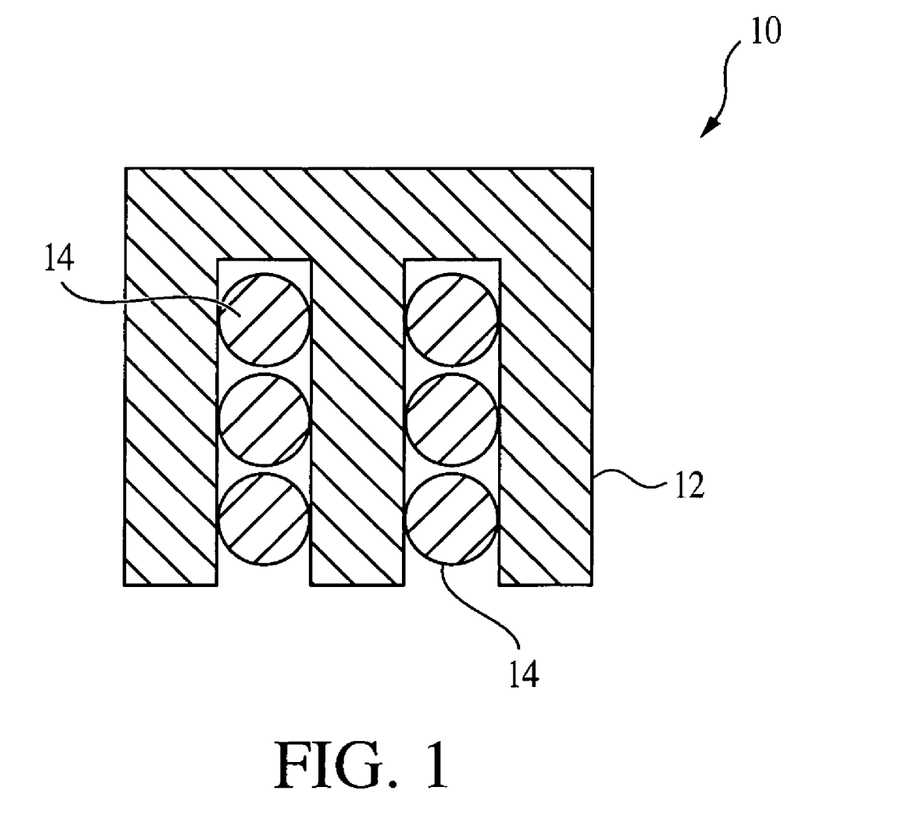
FIG. 1 is a schematic diagram of a representative eddy current sensor head.

FIG. 1 schematically illustrates a representative eddy current sensor head 10 that can be used in a thickness measurement device in accordance with various embodiments of the invention. The eddy current sensor head 10 includes a pot core 12 and a coil 14. By way of example, the core 12 can be a split ferrite pot core. The core 12 can, e.g., have a diameter of about 9 mm and a height of about 4 mm. Cores having other configurations and sizes can also be used. By way of example, the coil 14 can comprise 26–32 gauge wire and have about 10–30 turns. Other wire sizes and coil configurations can also be used.

The sensor coil 14, when driven by an AC current, generates an oscillating magnetic field that induces an eddy current in, the surface of the test object. The eddy current is dependent on the strength of the magnetic B-field created by the AC current and the impedance of the object, which is related to the thickness of the object and the resistivity of the object. The thickness of the object can accordingly be determined based on the known resistivity of the object and the eddy current detected by the sensor coil.

Other types of eddy current sensor heads can also be used. These include, e.g., sensor heads with two coils, in which a primary coil is driven by an AC current and generates an oscillating magnetic field, and a secondary pickup coil receives a responsive signal from the test object.

Figure 2:
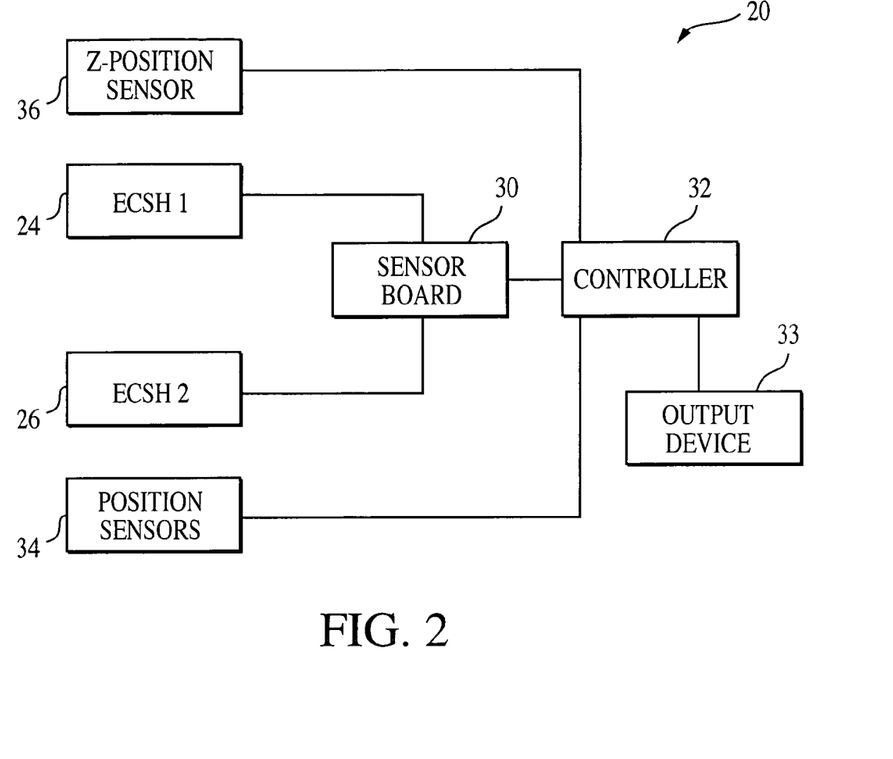
FIG. 2 is a block diagram of an apparatus for measuring the thickness of an object in accordance with one or more embodiments of the invention.
Figure 3:
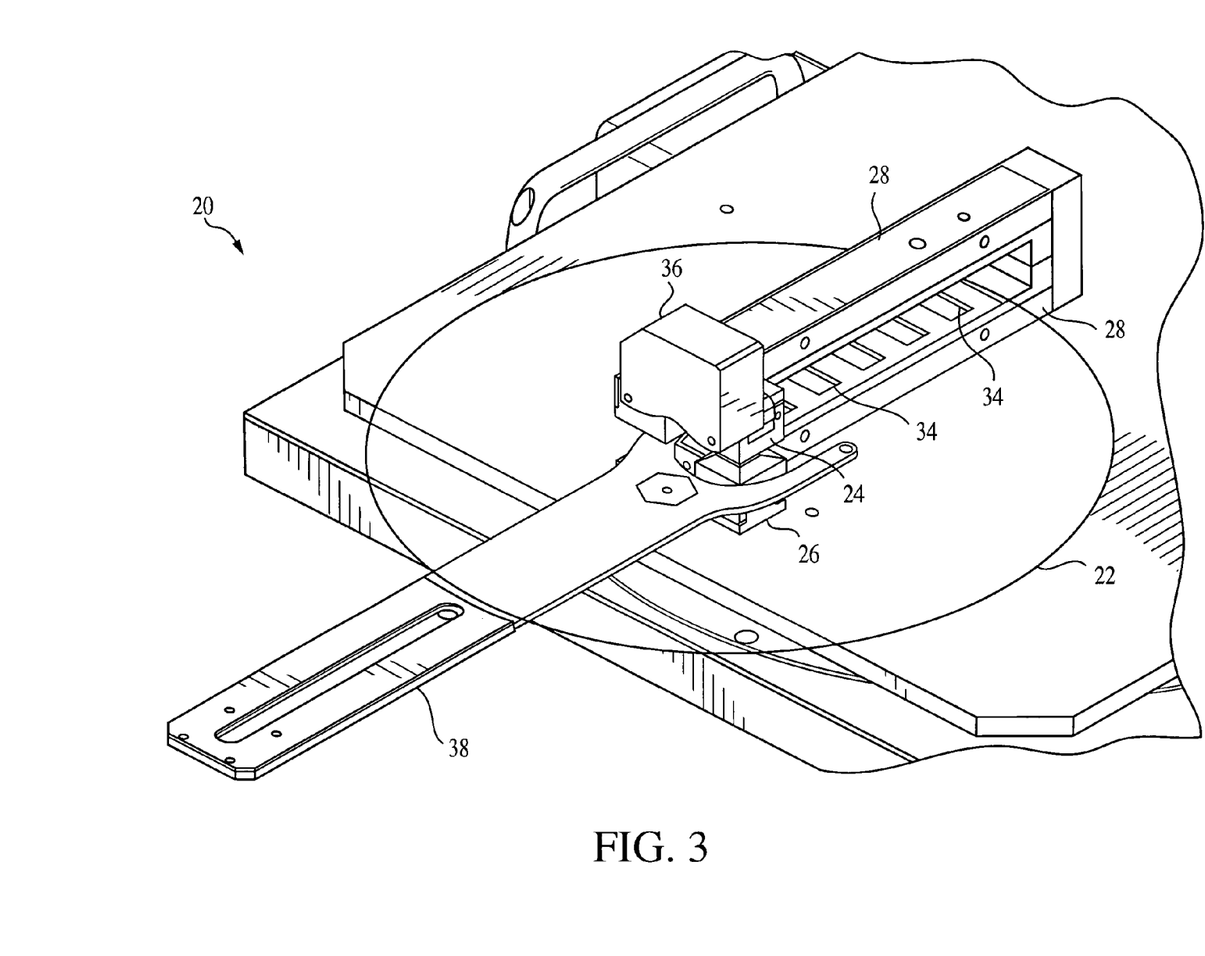
FIG. 3 is a perspective view of certain components of the FIG. 2 apparatus.

FIG. 2 is a representative block diagram of an apparatus 20 for measuring the thickness of a test object in accordance with one or more embodiments of the invention. FIG. 3 is a perspective view of some elements of the apparatus 20. Referring now to FIGS. 2 and 3, the apparatus 20 includes an eddy current sensor, which has two sensor heads 24, 26 that can be connected in either a serial or parallel circuit. The sensor heads 24, 26 are mounted on respective brackets 28 such that they are spaced a predetermined distance from each other, forming a gate or gap therebetween. The gate distance can be varied depending on the size of the test object being measured. A typical range for use, e.g., in semiconductor manufacturing for measuring the thickness of layers deposited on wafers can be between about 2–6 mm. Such a range has been found to provide suitable spot size, signal strength and handling reliability in typical semiconductor processing applications.

The eddy current sensor heads 24, 26 can be connected to a sensor board circuit 30, which generates the AC current for driving the sensor heads 24, 26 and which receives a pickup eddy current signal from the sensor heads 24, 26 indicative of the test object thickness. The pickup eddy current signal with voltage form is transmitted to a controller 32, which can include an analog to digital converter for converting the pickup signal to a digital signal for processing as will be described below.

The AC current used to drive the coils can vary. By way of example, the driving current can be at frequencies between about 300 kHz and 5 MHz. Other current values are also possible.

The device 20 also includes an array of position sensors 34, which detect the position of the test object 22 as it is moved through the gap between the eddy current sensor heads 24, 26. The position sensors 34 are connected to the controller 32, which can determine the sampling locations on the test object 22 when thickness measurements are made. One example of a position sensor that can be used in the array is an optical sensor such as a through-beam type sensor. Examples of suitable position sensors include the model EX-11 sensor commercially available from SUNX of Japan.

To further increase measurement accuracy, one or more embodiments of the present invention contemplate the inclusion of a Z-position sensor 36 to measure the distance between the test object 22 and the sensor heads 24, 26 in order to determine any distance related compensation factor that can be applied to the raw data to compensate for distance and vibration effects. One example of a suitable Z-position sensor is a laser distance sensor. An example of such a sensor is the model XZ-30V sensor commercially available from OMRON of Japan.

The controller 32 computes the thickness of the test object 22 at the various sampling locations based on respective readings from the sensors. A representative controller 32 can include an analog to digital converter, a PLC (Programmable Logic Control) and a PC (personal computer). The analog to digital converter converts analog signals from the eddy current sensor and the Z-position sensor to digital form for processing. The PLC receives sensing signals from the sensors and performs data logging or collection functions. The PC receives data from the PLC and performs measurement and compensation calculations. The measurement results can be output to an output device 33 such as, e.g., a computer display or printer.

Various known methods can be used for computing the thickness of the test object from the eddy current sensor readings. For example, one such known method uses empirical data of eddy current sensor readings taken of particular test objects having known thicknesses to generate sensor reading calibration curves. In use of the device, eddy current sensor readings can be mapped to the calibration curves to determine the thickness of measured test objects.

By way of example, operation of the device 20 is now described for determining the thickness of a conductive layer on a wafer substrate 22. The wafer 22 is positioned on an end effector 38 connected to a robotic arm. The robotic arm is then actuated to move the wafer through the gate formed by the pair of eddy current sensor heads 24, 26. As the wafer 22 moves through the gate, it passes the array of position sensors 34, which are successively tripped or actuated by the leading edge of the wafer 22. A sensing routine is triggered when the wafer 22 passes the first position sensor 34. The sensing routine can include the eddy current sensor taking periodic thickness readings (e.g., at a sampling rate of 1,000 readings/second), and the position sensors 34 detecting when the wafer edge passes each successive sensor to determine the velocity of the wafer. Using this information, the controller 32 can determine the measured thickness at each sampling location and the position of each sampling location on the wafer. In this manner, thickness measurements can be taken along a given line extending across the wafer. Measurements along different lines across the wafer can be taken, if desired, by rotating the wafer to a desired position and then moving it through the device 20 while making measurements.

The device preferably makes measurements on-the-fly, i.e., while the wafer is being moved through the gap between the sensor heads. High sampling rates are possible, allowing the wafer thickness to be quickly measured. For example, and in accordance with one or more embodiments of the invention, a wafer having a diameter of about 300 mm can be measured in about two seconds, at about 2,000 sampling points. Other sampling rates can also be used.

By using two eddy current sensor heads on opposite sides of the test object, inadvertent movement of a given sampling location toward or away from the sensor heads (resulting from movement of the test object through the gap) does not significantly affect the measurement. Accordingly, more accurate measurements can be made at each sampling location. Also, the need for extensive positioning control mechanisms is avoided, and the measurements can be made more quickly. The sensor readings can be continually made as the test object moves through the gap between the eddy current sensor heads.

By making quick and accurate measurements of the thickness of the conductive layer on the wafer, corrective action can be taken, if needed, to obtain a desired thickness. For example, if a generally uniform thickness is desired and the measurements indicate that the thickness is not sufficiently uniform, the wafer can be subjected to selective chemical mechanical polishing or other processes to obtain the desired uniform thickness.

Figure 4:
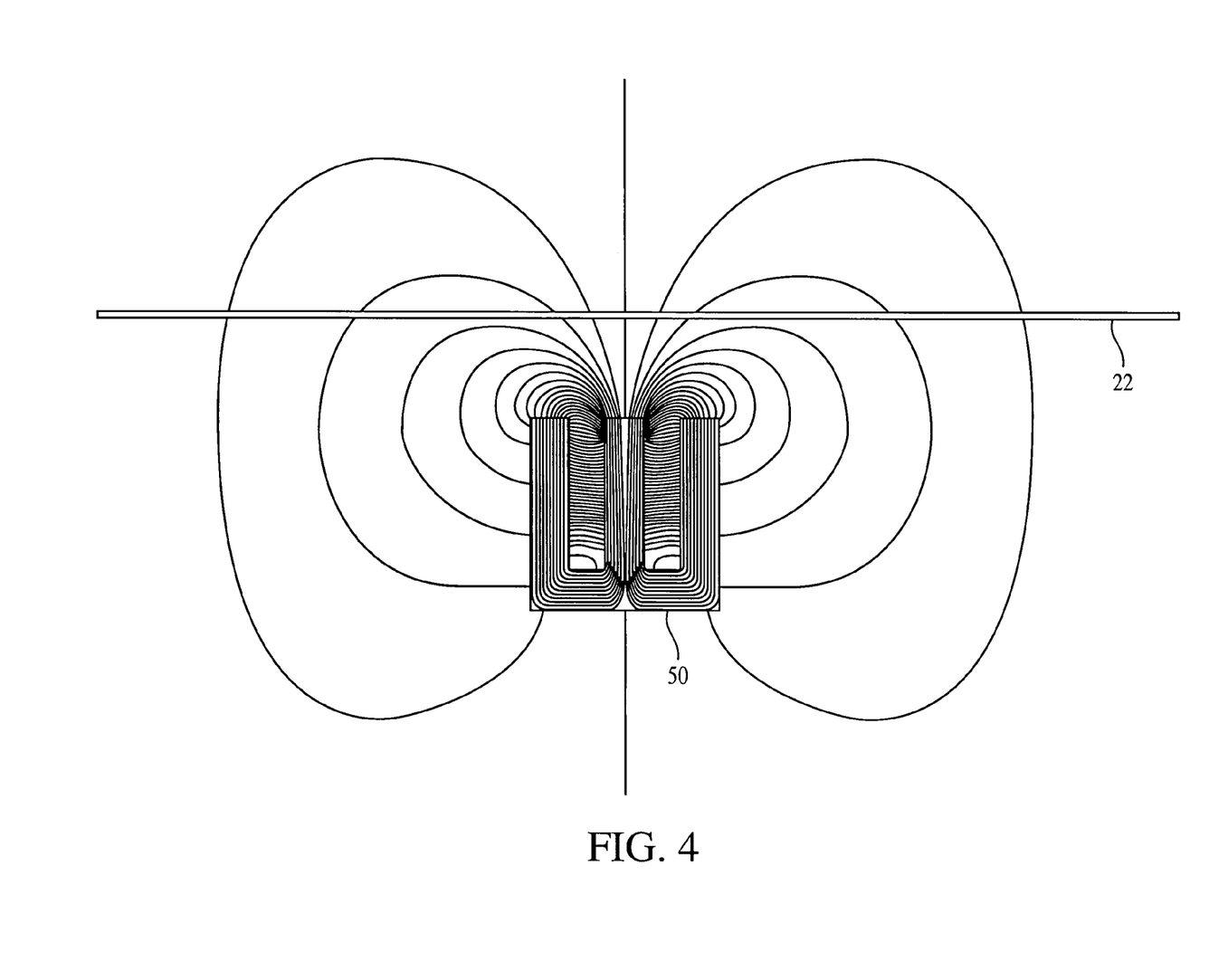
FIG. 4 is a schematic illustration of representative flux lines of a single eddy current sensor in accordance with the prior art.

FIG. 4 illustrates a representative set of flux lines generated by a single eddy current sensor 50 as used in prior art thickness measurement devices. The eddy current sensor generates a pattern of magnetic flux lines. The test object intersects a plurality of the flux lines at a given spacing from the eddy current sensor. If the test object 22 is inadvertently moved toward or away from the eddy current sensor, the number of flux lines intersected by the test object can change significantly even for small movements of the test object. As the number of flux lines intersected by the test object changes, so does the measurement reading of the eddy current sensor, reducing its accuracy.

Figure 5:
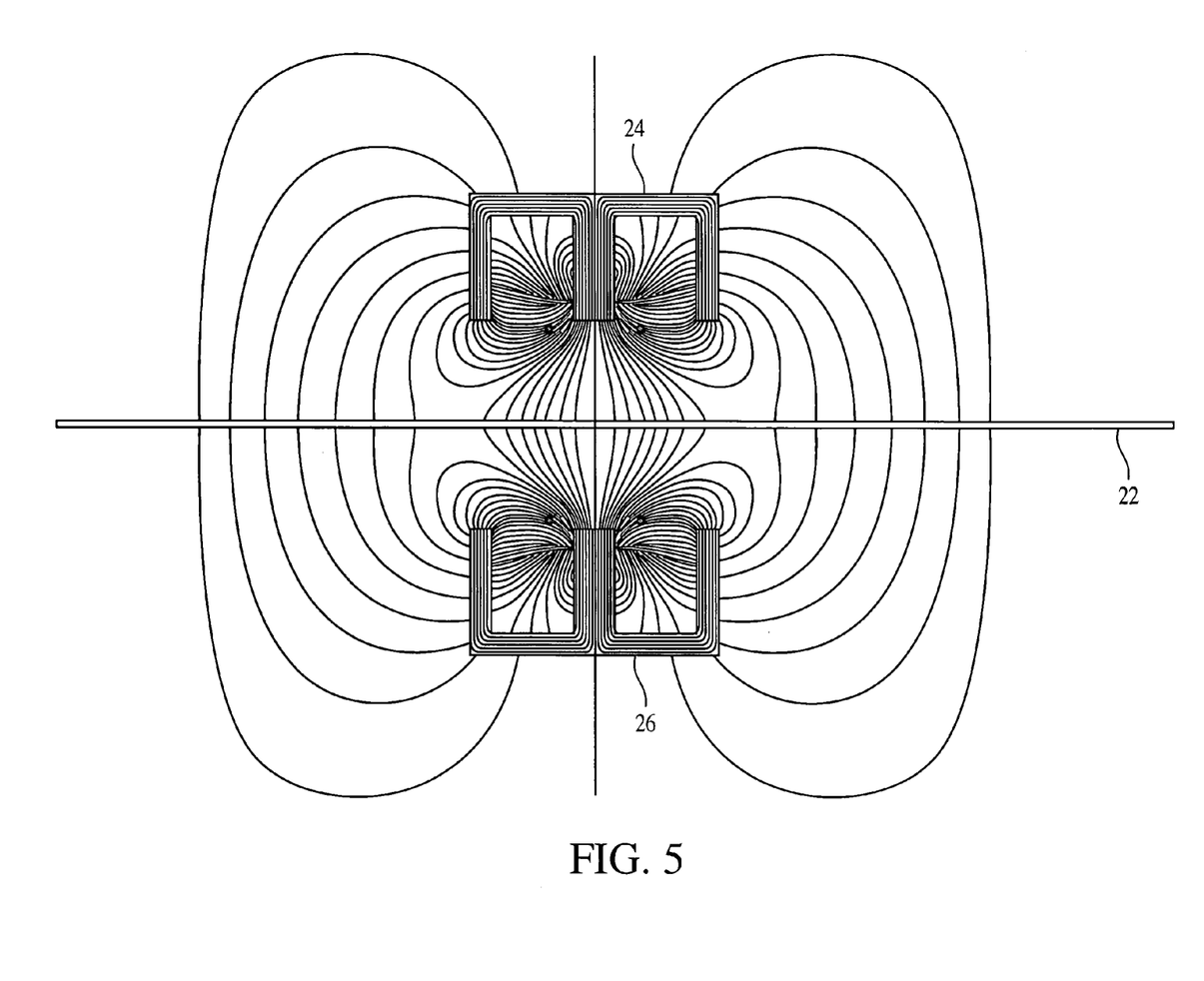
FIG. 5 is a schematic illustration of representative flux lines of the dual eddy current sensor heads of the FIG. 2 apparatus.

FIG. 5 illustrates a representative set of flux lines generated by the dual eddy current sensor heads 24, 26 used in devices 20 in accordance with the various embodiments described above. As shown, the test object 22 can be moved toward or away from respective sensor heads 24, 26 with a significantly reduced change in the number of flux lines intersected. Accordingly, the device has reduced sensitivity to variations in distance between the test object and the eddy current sensor heads.

Figure 6:
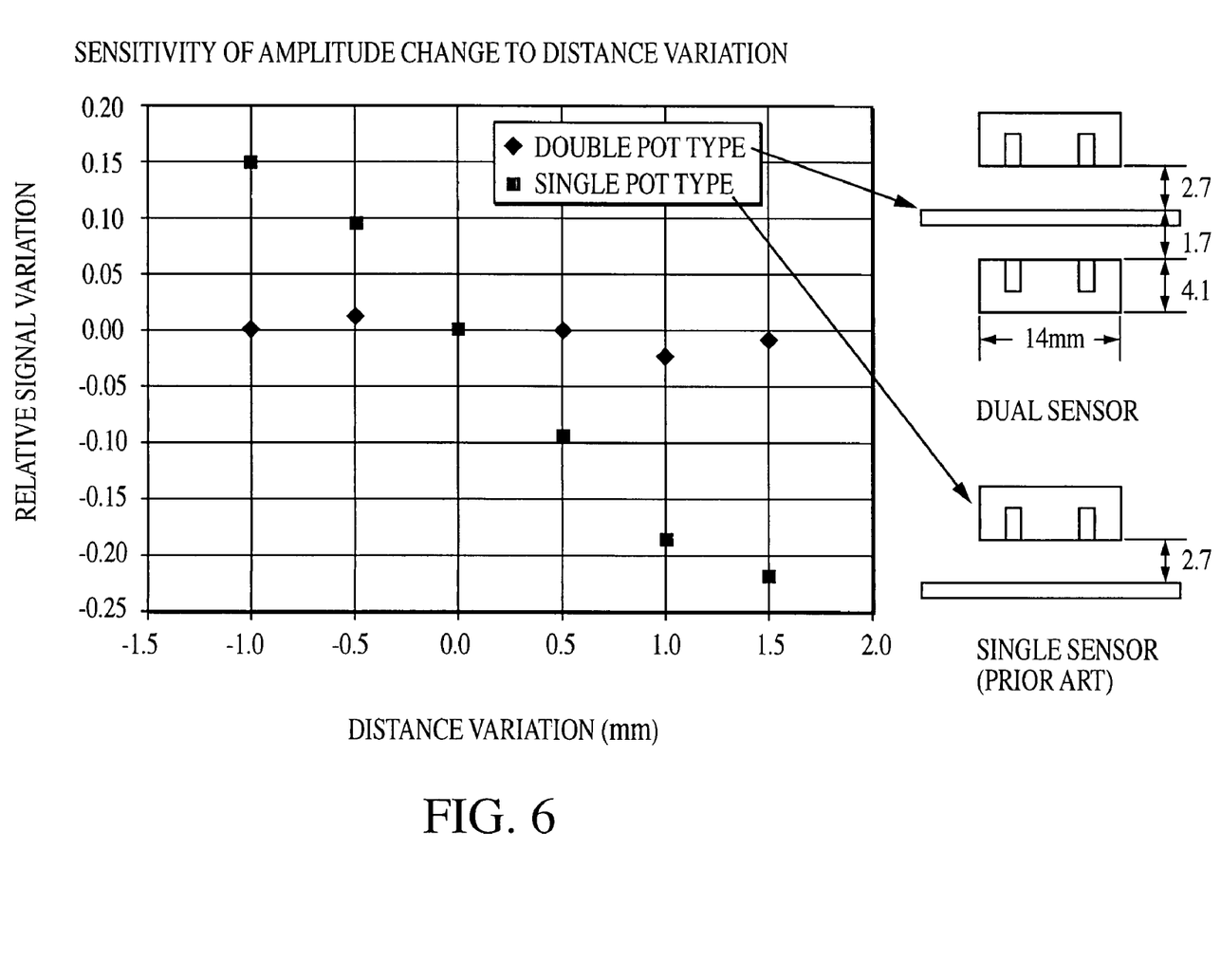
FIG. 6 is a graph illustrating the reduced sensitivity of an apparatus in accordance with one or more embodiments of the invention to changes in the distance between the test object and the eddy current sensor heads.

FIG. 6 illustrates an example of the differences in sensitivity to distance variations measured for two devices 24, 26, one having a single eddy current sensor head and the other having dual eddy current sensor heads. The dimensions shown in FIG. 6 for the size of the sensors are provided by way of example only. These dimensions can vary depending on the particular application.

Figure 7:
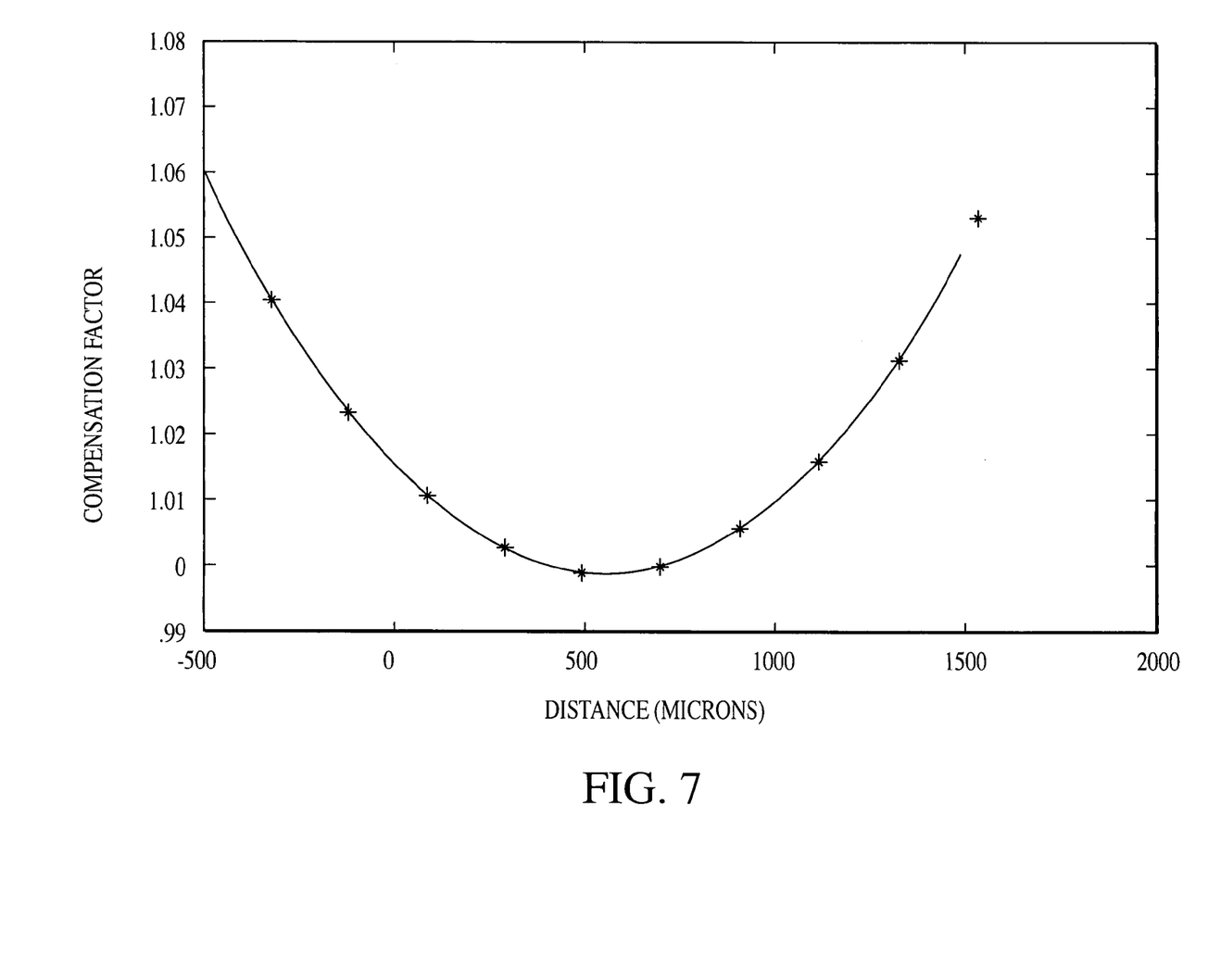
FIG. 7 is a graph illustrating representative values for distance compensation factors in accordance with one or more embodiments of the invention.

To even further increase accuracy of thickness measurements, the Z-axis sensor can be used to compensate for inadvertent movement of the test object in a direction between the sensor heads. The Z-axis sensor 36 can detect the distance between the test object 22 and the eddy current sensor 24, 26 heads to determine a distance related compensation factor to be applied to the raw data generated by the sensors to compensate for distance and vibration effects. FIG. 7 is a graph illustrating representative compensation values that can be selected based on the distance moved by the test object relative to the sensor heads. The values in the graph were empirically determined, and can vary based on the device used and the object being measured.

Figure 8:
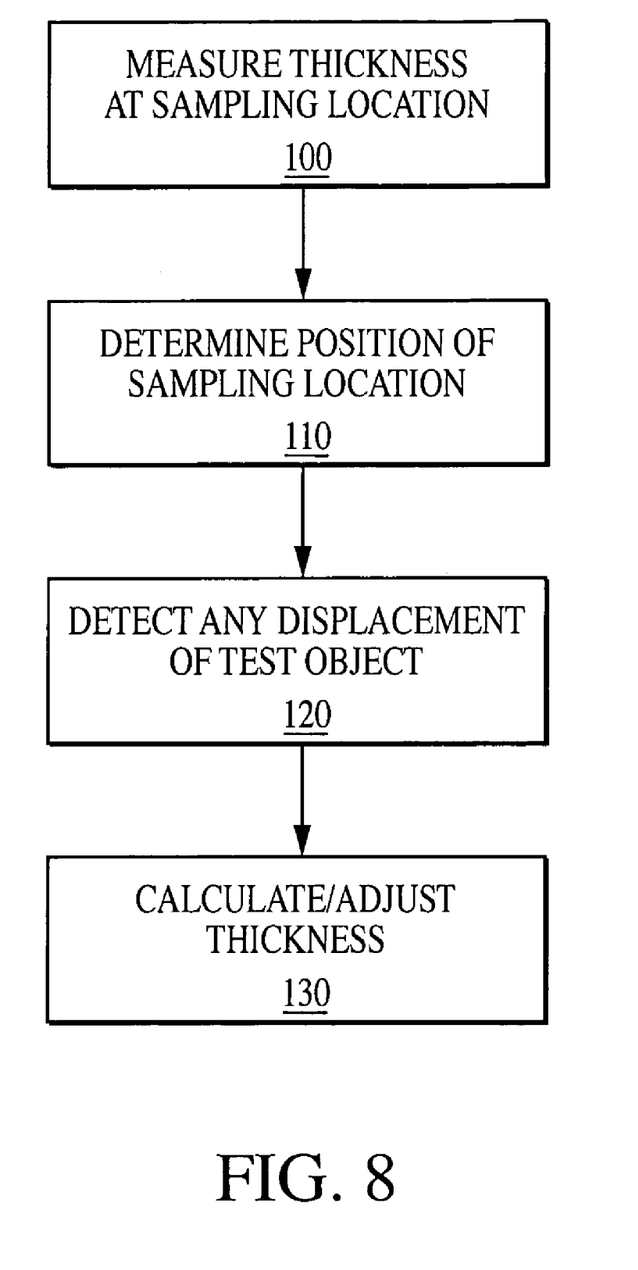
FIG. 8 is a flow chart illustrating a process for measuring the thickness of an object in accordance with one or more embodiments of the invention.

FIG. 8 is a flow chart generally illustrating a process for measuring the thickness of a test object in accordance with one or more embodiments of the invention. At step 100, a thickness measurement of the test object is made at a sampling location on the test object using first and second eddy current sensor heads positioned on opposite sides of the test object while moving the test object past the eddy current sensor heads. At step 110, the position of the sampling location on the test object is determined. At step 120, any displacement of the test object in a direction generally extending between the first and second sensor heads is detected. At step 130, the thickness of the test object at the sampling location is calculated and adjusted, if needed, to compensate for any detected displacement of the test object.

Having described preferred embodiments of the present invention, it should be apparent that modifications can be made without departing from the spirit and scope of the invention.

What is claimed is:

1. An apparatus for dynamically measuring thickness of a test object, comprising:
    an eddy current sensor having first and second sensor heads, said sensor heads positioned substantially opposite each other and defining a predetermined gap therebetween for passage by at least a portion of the test object through said gap, said first and second sensor heads making measurements at one or more sampling locations on said test object when at said gap;
    a mechanism for moving the test object through said gap while said measurements are made;
    a position sensing mechanism, said position sensing mechanism being used to determine one or more positions of said one or more sampling locations on said test object; and
    an evaluation circuit in communication with the eddy current sensor and with the position sensing mechanism, said evaluation circuit being used to determine the thickness of the test object at said one or more sampling locations.

2. The apparatus of claim 1, wherein said mechanism for moving the test object through said gap comprises a robotic end effector.

3. The apparatus of claim 1, further comprising a displacement sensor for detecting displacement of the test object in a direction generally extending between the first and second sensor heads.

4. The apparatus of claim 3, wherein said displacement sensor is in communication with said evaluation circuit, and wherein said evaluation circuit adjusts said measurements of said sensor heads to compensate for detected displacement of the test object.

5. The apparatus of claim 3, wherein said displacement sensor comprises a laser distance sensor.

6. The apparatus of claim 1, wherein said evaluation circuit is implemented in a computer controller.

7. The apparatus of claim 6, wherein said controller comprises an analog to digital converter, a programmable logic control, and a personal computer.

8. The apparatus of claim 1, wherein said position sensing mechanism comprises an array of position sensors that successively detect an edge of the test object as the test object is moved through said gap.

9. The apparatus of claim 8, wherein said evaluation circuit determines a velocity of the test object from outputs of said position sensors.

10. The apparatus of claim 8, wherein each position sensor comprises an optical sensor.

11. A method of measuring thickness of a test object, comprising the steps of:
   moving the test object through a gap between two eddy current sensor heads, said two eddy current sensor heads being positioned substantially opposite each other;
   making on-the-fly measurements at one or more sampling locations on said test object using the eddy current sensor heads as the test object is moved through said gap;
   determining one or more positions of said one or more sampling locations on said test object; and
   calculating the thickness of the test object at said one or more sampling locations.

12. The method of claim 11, wherein the step of moving said test object is performed using a robotic end effector.

13. The method of claim 11, further comprising detecting displacement of the test object in a direction generally extending between the first and second sensor heads.

14. The method of claim 13, further comprising adjusting said measurements to compensate for said displacement of the test object.

15. The method of claim 11, further comprising displaying data specifying the thickness of the test object at said sampling locations.

16. The method of claim 11, wherein determining the positions of said sampling locations on said test object comprises successively detecting an edge of the test object as the test object is moved past said sensor heads.

17. The method of claim 16, further comprising determining the velocity of said test object.

18. An apparatus for measuring thickness of a conductive layer on a wafer substrate, comprising:
   an eddy current sensor having two substantially opposed sensor heads mounted in said apparatus to have a predetermined gap therebetween for passage by at least a portion of the wafer substrate through said gap, said first and second sensor heads making on-the-fly thickness measurements of said conductive layer at given sampling locations on said wafer substrate as said wafer substrate is passed through said gap;
   a position sensing mechanism to sense positions of said wafer substrate relative to said sensor heads as said wafer substrate is passed through said gap;
   a controller connected to the eddy current sensor and to the position sensing mechanism for calculating the thickness of the conductive layer at said sampling locations.

19. The apparatus of claim 18, further comprising a robotic end effector for moving the wafer substrate through said gap.

20. The apparatus of claim 18, further comprising a displacement sensor for detecting displacement of the wafer substrate in a direction generally extending between the first and second sensor heads.

21. The apparatus of claim 20, wherein said displacement sensor is in communication with said controller, and wherein said controller adjusts said measurements of said sensor heads to compensate for said displacement of the wafer substrate.

22. The apparatus of claim 20, wherein said displacement sensor comprises a laser distance sensor.

23. The apparatus of claim 18, wherein each sensor head includes a core and at least one coil mounted therein.

24. The apparatus of claim 23, wherein said controller comprises an analog to digital converter, a programmable logic control, and a personal computer.

25. The apparatus of claim 18, wherein said position sensing mechanism comprises an array of position sensors that successively detect an edge of the wafer substrate as the wafer substrate is moved through said gap.

26. The apparatus of claim 25, wherein said controller determines a velocity of the wafer substrate from outputs of said position sensors.

27. The apparatus of claim 25, wherein each position sensor comprises an optical sensor.

28. A method of measuring thickness of a conductive layer on a wafer substrate, comprising the steps of:
   making on-the-fly thickness measurements of said conductive layer at multiple sampling locations on said wafer substrate using first and second eddy current sensor heads positioned on substantially opposite sides of said wafer substrate while moving said wafer substrate past said eddy current sensor heads;
   determining positions of said sampling locations on said wafer substrate; and
   calculating the thickness of the conductive layer at said sampling locations.

29. The method of claim 28, further comprising detecting displacement of the wafer substrate in a direction generally extending between the first and second sensor heads.

30. The method of claim 29, further comprising adjusting said measurements to compensate for said displacement of the wafer substrate.

31. The method of claim 28, further comprising displaying data specifying the thickness of the wafer substrate at said sampling locations.

32. The method of claim 28, wherein determining the positions of said sampling locations on said wafer substrate comprises successively detecting an edge of the wafer substrate as the wafer substrate is moved past said sensor heads.

33. The method of claim 32, further comprising determining the velocity of said wafer substrate.

34. A method of measuring thickness of a test object, comprising the steps of:
   generating magnetic flux on substantially opposite sides of the test object and sensing induced eddy currents on said test object at multiple sampling locations on said test object while the test object is moved relative to a given position;
   determining positions of said sampling locations; and
   calculating the thickness of the test object at said sampling locations.

35. The method of claim 34, wherein said magnetic flux is generated by two opposed eddy current sensor heads, and wherein said given position is a position between said sensor heads.

36. The method of claim 34, wherein said magnetic flux is generated by two opposed eddy current sensor heads, and said method further comprises detecting displacement of the test object in a direction generally extending between the first and second sensor heads.

37. The method of claim 36, further comprising adjusting thickness calculations to compensate for said displacement of the test object.

38. The method of claim 34, further comprising displaying data specifying the thickness of the test object at said sampling locations.

39. An apparatus for measuring thickness of a test object, comprising:
   means for generating magnetic flux on substantially opposite sides of the test object and for sensing induced eddy currents on said test object at multiple sampling locations on said test object as said test object is moved relative to a given position;
   means for determining positions of said sampling locations; and
   means for calculating the thickness of the test object at said sampling locations.

40. The apparatus of claim 39, wherein said means for generating magnetic flux comprises two opposed eddy current sensor heads, and said apparatus further comprises a robotic end effector for moving said test object relative to said sensor heads.

41. The apparatus of claim 39, wherein said means for generating magnetic flux comprises two opposed eddy current sensor heads, and said apparatus further comprises a detector for detecting displacement of the test object in a direction generally extending between the first and second sensor heads.

42. The apparatus of claim 41, further comprising means for adjusting thickness calculations to compensate for said displacement of the test object.

43. The apparatus of claim 39, further comprising an output device for displaying data specifying the thickness of the test object at said sampling locations.

44. A method of measuring thickness of a test object, comprising the steps of:
   moving the test object using a robotic end effector past an eddy current sensor;
   making on-the-fly measurements at one or more sampling locations on said test object using the eddy current sensor as the test object is moved past said eddy current sensor wherein said eddy current sensor comprises two eddy current sensor heads positioned substantially opposite each other;
   determining one or more positions of said one or more sampling locations on said test object; and
   calculating the thickness of the test object at said one or more sampling locations.

45. The method of claim 44, wherein determining the positions of said sampling locations on said test object comprises successively detecting an edge of the test object as the test object is moved past said eddy current sensor.

* * * * *